Dec. 25, 1951 L. M. ILGENFRITZ ET AL 2,580,097

SYSTEM FOR TESTING CABLE REPEATERS

Filed Dec. 17, 1949 3 Sheets-Sheet 1

INVENTORS L. M. ILGENFRITZ
R. W. KETCHLEDGE

BY

ATTORNEY

SYSTEM FOR TESTING CABLE REPEATERS

Filed Dec. 17, 1949 3 Sheets-Sheet 2

INVENTORS L.M. ILGENFRITZ
R.W. KETCHLEDGE
BY W.A. Dawson
ATTORNEY

INVENTORS L. M. ILGENFRITZ
R. W. KETCHLEDGE
BY
W. A. Dawson
ATTORNEY

Patented Dec. 25, 1951

2,580,097

UNITED STATES PATENT OFFICE 2,580,097

SYSTEM FOR TESTING CABLE REPEATER

Lester M. Ilgenfritz, Mamaroneck, N. Y., and Raymond W. Ketchledge, Middlesex, N. J., assignors to Bell Telephone Laboratories, Incorporated, New York, N. Y., a corporation of New York Application December 17, 1949, Serial No. 133,538

12 Claims. (Cl. 179—175.31)

This invention relates to means for testing the repeaters, or amplifying elements, associated with the lengths of long, inaccessible electrical transmission systems, such as submarine cables used for the transmission of intelligence by telephony and telegraphy.

The object of the invention is a system in which each repeater is designed to have a transmission irregularity or other characteristic at a distinguishing frequency within a narrow band of frequencies which results in the production of a noise current and, at one or both ends, the system is associated with meter means for measuring the noise currents and transmission loss or gain in each narrow band to determine the operating conditions of the repeaters.

A feature of the invention is the association with each repeater of a resonant device, such as a crystal, designed to be sharply resonant over a narrow band of frequencies; the band of frequencies being different for each repeater. In one embodiment the resonant device is associated with the feedback, or beta, circuit of the repeater, in another embodiment, the resonant device is associated with the gain, or mu, circuit of the repeater, in a third embodiment, the resonant device is associated with the input or output circuit of the repeater.

A further feature of the invention, where feedback amplifiers are used, is the selection of mu-beta circuit phase correction and adjustment with auxiliary circuit elements to insure that at the peak of the transmission irregularity the mu-beta phase is substantially the same as that at mid-band and that the singing margin of the amplifier is not appreciably reduced at other frequencies.

In recent years, the use of long cables for the transmission of intelligence, such as telephone and telegraph cables, has been rapidly increasing; and this use has aroused interest in the problem of using cables of this general character through territory, such as the ocean or other large body of water, in which the cable is not easily accessible. Due to the transmission losses in such cables, the transmitted waves must be amplified at rather short intervals, thus necessitating the use of repeaters spaced some thirty to fifty miles apart along the cable. These repeaters may be encased within an enlargement of the cable sheath; and, with skillful design and good materials, the average useful life of the repeaters is satisfactory, though it is reasonable to expect some of the repeaters will have a useful life less than the average. Hence, it is important to be able to test the electrical condition of each repeater from some accessible spot, such as the cable terminals. By such tests, the gradual deterioration in the repeaters may be measured at suitable intervals, and arrangements made to repair, or replace, a faulty repeater in a season of the year when weather conditions are favorable, materially reducing the cost of the necessary cable ship operations.

In systems of this character, the repeaters are connected in series with the cable conductor and direct current may conveniently be supplied over the cable conductor to the repeaters to energize the heaters of the repeaters and activate the anode circuits. Faults which develop in this direct-current circuit may be determined by the usual direct current, or low frequency tests; but other faults, such as a slow decrease in the gain of a repeater, may develop, which will affect the transmission of the signals, even though the direct current circuit is substantially unaffected. As all the repeaters are connected in series with the cable conductor, in order to reduce the total direct potential applied to the cable, the voltage drop for each repeater is rather small; thus the capacity of the repeaters to handle signal power is quite low.

A satisfactory means for testing such repeaters should not require for its operation the transmission of any substantial amount of signal power, to avoid overloading the repeaters; should be compact, stable and rugged; and should not add any appreciable hazard to the successful operation of the system.

Figure 1:
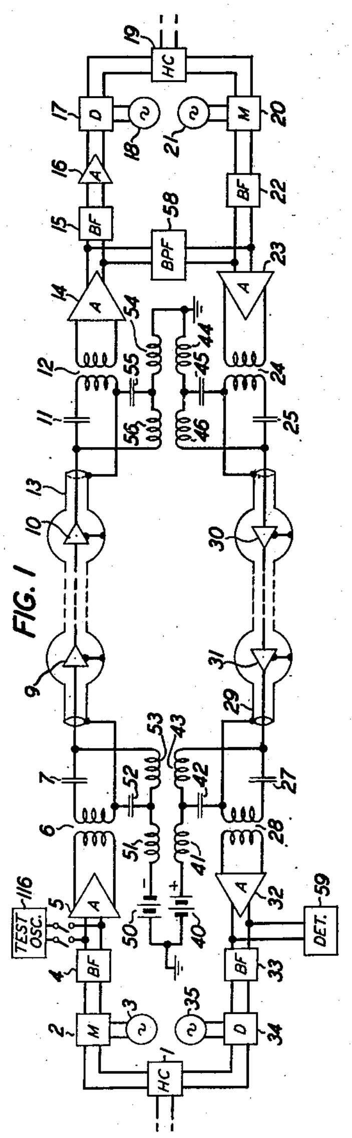
Fig. 1 shows a typical submarine cable system embodying the invention.

The system shown in Fig. 1 is similar to the system shown in United States Patent 2,020,297, November 12, 1935, O. E. Buckley et al., and includes two one-way repeatered cables connected to form a two-way system. Signal waves supplied to the hybrid coil 1 are transmitted to the modulator 2, where the waves modulate the waves from a carrier wave source 3, and a product of this modulation is selected by a band-pass filter 4 and supplied to the input circuit of amplifier 5. Signal waves from other sources may be modulated, with waves from other carrier sources filtered, and supplied to amplifier 5. The output of amplifier 5 is connected by transformer 6 and capacitor 7 to the central conductor 8 of the cable, thence, through the cable, and associated repeaters 9, 10, etc., capacitor 11, and primary winding of transformer 12, through the return conductor 13 back to transformer 6. The output of transformer 12 is conducted through amplifier 14, band-pass filter 15, amplifier 16 to demodulator 17 where the modulated carrier waves are demodulated with waves from source 18, the signal currents being supplied through hybrid coil 19 to the line.

Signals supplied to the hybrid coil 19 modulate the carrier waves from source 21 in the modulator 20, and the desired products of modulation are selected by band-pass filter 22 and supplied to amplifier 23. The output of amplifier 23 is supplied through transformer 24 and capacitor 25 to the central conductor 26 of the other cable, thence through this conductor, amplifiers 30, 31, etc., capacitor 27 and primary winding of transformer 28. The output of transformer 28 is supplied through amplifier 32 and band-pass filter 33 to demodulator 34 where it is demodulated by carrier waves from source 35, the signal currents passing through hybrid coil 1 to the line.

The vacuum tubes in the repeaters are preferably of the indirectly heated cathode type, with the heaters connected in series with each other and the central conductor of the cable. The anode circuits of the vacuum tubes are energized by the voltage drop across the heaters of a repeater. Direct current is supplied to the heaters through the central conductor of the cable, thus, in a long cable having a large number of heaters in series, the voltage required may be quite high, and to reduce the maximum voltage required, two or more sources may be used.

Current from the grounded source 40 will flow through the low-pass filter formed by the inductors 41, 43, and capacitor 42, the central conductor 26, and the heaters of the vacuum tubes in repeaters 31, 30, to ground through the low-pass filter formed by the inductors 46, 44 and capacitor 45. Similarly, current will flow from ground through the low-pass filter formed by inductors 54, 56, and capacitor 55, the central conductor 8, and the heaters of the vacuum tubes in repeaters 10, 9, through the low-pass filter formed by inductors 53, 51, and capacitor 52, to the grounded source 50.

In accordance with the present invention, each cable may be individually tested by using a test set for each cable, to conserve the frequency space allowance for the crystals. Where such conservation is unimportant or only a few repeaters are involved, the far ends of the cables may be connected by a band-pass filter 58, and the test set 59 connected to the near receiving end, thereby conserving testing apparatus and centralizing all repeater testing. In the latter arrangement the tests on all repeaters in both directions are made from the one terminal.

Figure 2:
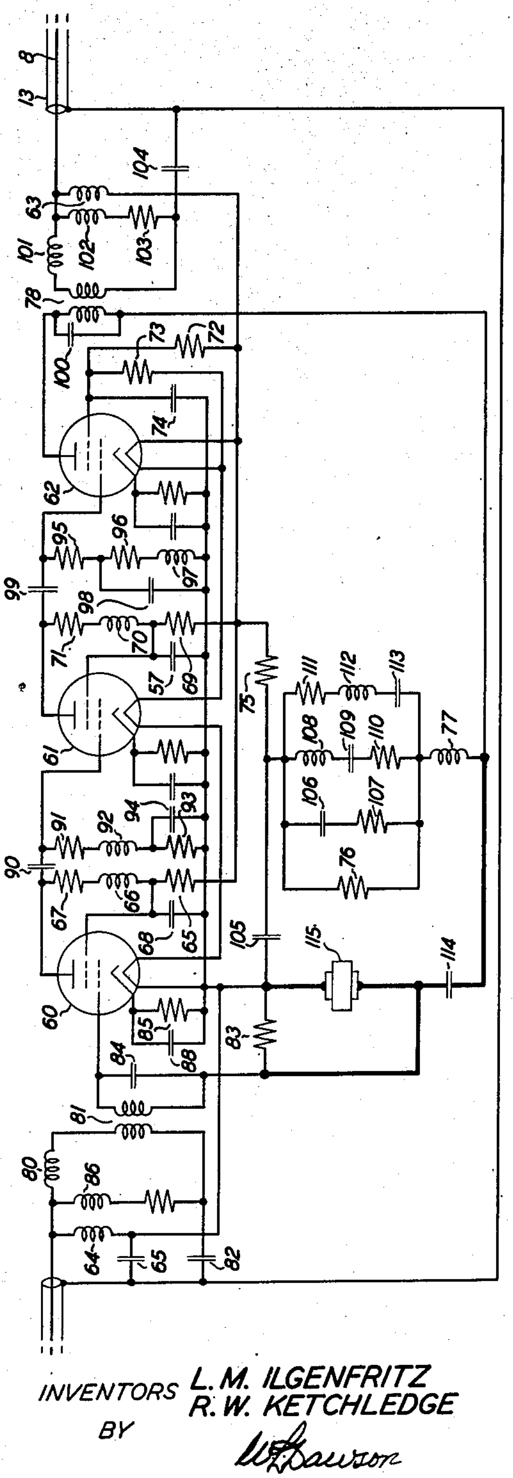
Fig. 2 is a detailed schematic circuit of the repeaters shown in Fig. 1, employing one embodiment.

The repeater shown in Fig. 2 is designed to operate over the band from 12 to 120 kilocycles, but the invention is not in any way limited thereby and may be adapted for use in conjunction with repeaters operative over other bands of frequencies.

The direct current from the center conductor 8 flows through the inductor 63, the heaters of tubes 62, 61, 60 in series, and inductor 64 to the center conductor of the cable. The inductors 63, 64, with capacitor 65, reduce the flow of alternating currents in this path. The screen grid and anode of tube 60 are energized through resistor 65, the anode also through inductor 66 and resistor 67; the screen grid and anode of tube 61 are energized through resistor 69, the anode also through inductor 70 and resistor 71; the screen grid of tube 62 is energized from the potential divider formed of resistors 72, 73, while the anode of tube 62 is energized through resistors 75, 76, inductor 77 and transformer 78.

The attenuation of the section of cable between repeaters is some 45 decibels larger for the high frequencies than for the low frequencies, thus, the response frequency characteristic of the repeater is shaped to equalize this variation and produce a substantially flat response frequency characteristic of the section of cable with the repeater over the desired band. For convenience, this shaping is divided into about 17 decibels in the input network, 15 decibels in the output network and 13 decibels in the feedback circuit. Of course other distributions of shaping may be used, if desired.

The carrier waves flow from the central conductor of the cable through inductor 80, primary winding of transformer 81, and capacitor 82 to the return conductor. The secondary winding of transformer 81 is shunted by a capacitor 84 and is connected to the signal grid of tube 60 and, through resistors 83, 85 to the cathode of tube 60. An inductor 86 in series with a resistor 87 is connected across the primary winding of transformer 81. At the low frequency end of the band, the input impedance is controlled largely by the resistor 87, but at the high frequency end of the band, the inductor 86 is a high impedance. The inductor 80 and capacitor 84 are proportioned wtih respect to the characteristics of transformer 81 to give the desired equalization, and to insure that at the highest signal frequencies the thermal noise of the central conductor of the cable will be the largest source of noise currents in the system.

The control grid of tube 60 is self-biased by the voltage drop in resistor 85. Over the transmitted band, resistor 85 supplies local negative feedback which aids in stabilizing the repeater. Similar by-passed biasing resistors are connected to the cathodes of tubes 61, 62.

Capacitor 68 by-passes the screen grid of tube 60 to prevent feedback within the transmitted band, but to permit negative feedback to stabilize the repeater for low audio frequencies. Similar capacitors 72, 74 by-pass the screen grids of tubes 61, 62.

The anode inductor 66 provides a fairly high coupling impedance in the transmitted band, and, with resistor 67, largely controls the slope of the cut-off below the transmitted band. The anode inductor 70, and resistor 71, have similar functions with respect to tube 61.

The anode of tube 60 is coupled by capacitor 90 to the control grid of tube 61. The control grid of tube 61 is connected to the cathode biasing resistor through the series combination of resistor 91, inductor 92, the capacitor 94, with resistor 93 shunting capacitor 94. Inductor 92 and capacitor 94 resonate a little below the center of the transmitted band, to control the characteristic in the central portion, while inductor 92 controls the characteristic at the upper end of the band and resistor 93 controls the characteristic at the lower end. Resistors 95, 96, inductor 97 and capacitors 98, 99, have similar functions with respect to tube 62.

The output circuit of tube 62 is similar to the input circuit of tube 60, the following elements having similar functions transformers 81 and 78, capacitors 84 and 100, inductors 80 and 101, capacitors 82 and 104, inductors 86 and 102, resistors 87 and 103.

The anode of tube 62 is connected through the primary winding of transformer 78 and then provides a feedback circuit through inductor 77, resistor 76, capacitor 105, and the cathode biasing resistor to the cathode of tube 62. Capacitor 106 connected in series with resistor 107 across resistor 76 controls the feedback at the lower frequencies. Inductor 108 is connected in series with capacitor 109 and resistor 110 across resistor 76 and is resonated at the upper limit of the transmitted band to reduce the feedback and increase the repeater gain in this region. Inductor 112 is connected in series with resistor 111 and capacitor 113 across resistor 76 and is resonated somewhat below the upper limit of the transmitted band to increase the gain in this region. Inductor 77 modifies the phase shift in the feedback circuit to stabilize the repeater.

The signal grid of tube 60 is connected through the secondary winding of transformer 81, grid leak resistor 83, and self-biasing resistor 85 to the cathode. The feedback voltage is introduced into the control grid circuit through coupling capacitor 114.

The repeater described above has an odd number, three, of stages of amplification, thus, the feedback circuit is connected from the output circuit to the signal grid forming part of the input circuit. If the repeater is designed to have an even number of stages, the feedback circuit may be connected from the output circuit to the cathode of the first tube. Obviously, if desired, the feedback loop may include less than all the stages of amplification in the repeater.

In so far as the present invention is concerned, no claim of novelty is advanced with respect to the elements of the repeater described up to the present point. The novelty of the present invention is in the association of the crystal 115 with the other elements of the repeater, and also the association of this crystal 115 with coupling capacitor 114. While for completeness of disclosure, a specific type of repeater has been described in detail, the scope of the invention is not limited thereby as the invention may be embodied in any suitable repeater having a feedback circuit or it may be employed in a repeater having no feedback.

The crystal 115 may be connected to form a sharply series resonant shunt across the feedback circuit, decreasing the feedback over a very narrow band of frequencies, and thus increasing the gain of the repeater over this narrow band of frequencies to form a narrow peak or spike in the gain frequency characteristic of the repeater. The frequencies of resonance of the crystals are different for each repeater so that each repeater has a gain peak or spike at a frequency characteristic of that repeater and only that repeater. However, to conserve band width, two or more repeaters could be assigned the same crystal frequency at a sacrifice of information concerning specific repeaters.

Due to their very sharp resonance characteristics, crystal resonators may advantageously be used for this purpose, but the invention is not limited thereto as other resonators, such as mechanical resonators, simple electrical tuned circuits or cavity resonators may be used, depending upon the range of frequencies to be transmitted, and the portion of the range assigned for this purpose.

The present repeater is designed for the transmission of signals in the range from 12 kilocycles per second to 124 kilocycles per second, and this part of the band is divided into 28 channels each 4 kilocycles wide. The crystals have a minimum pass band of one or two cycles per second and each crystal occupies about 100 cycles of the band so that the response characteristics of 40 crystals may be located in one channel 4000 cycles wide. Any channel may be reserved for this service, though preferably, a channel is selected such that the number of useful channels is not reduced. Thus, in the present repeater, the crystal peaks are located in the channel from 120 to 124 kilocycles per second.

The crystal 115 may be designed to produce a 25-decibel increase in gain over a band of one or two cycles, and such a large change in gain will be accompanied by a large phase irregularity which changes sign at the resonant frequency of the crystal and may reduce the phase margin around the loop to such an extent that the repeater may be only conditionally stable, or even definitely unstable.

The capacitor 114 has the usual function of blocking the positive direct anode potential of tube 62 from the signal grid of tube 60. Furthermore, the time constant of the combination of capacitor 114 and resistor 83 must be of such value as to preserve the proper gain frequency characteristic of the mu-beta loop to insure adequate low frequency phase margin for stability.

Capacitor 114 also has another important function, that is, to provide a reactance at crystal resonance such that said reactance forms a potential divider with the resonant resistance of the crystal. This potential divider controls the feedback voltage at resonance and so determines the height of the gain spike. Thus, the spike magnitude in the mu-beta path is proportional in decibles to $$20 \log \frac{1}{WCR}$$

where C is the capacity of capacitor 114 and R is the series resonant resistance of the crystal. At a frequency just above series resonance of the crystal the crystal becomes a positive reactance. This positive reactance will resonate with capacitor 114 when the two effective reactances become equal. This may be only about 10 cycles above crystal resonance. If the circuit losses are low this upper resonance will build up the feedback voltage on the grid many times above normal at this frequency resulting in a second spike of opposite sense.

Figure 4:
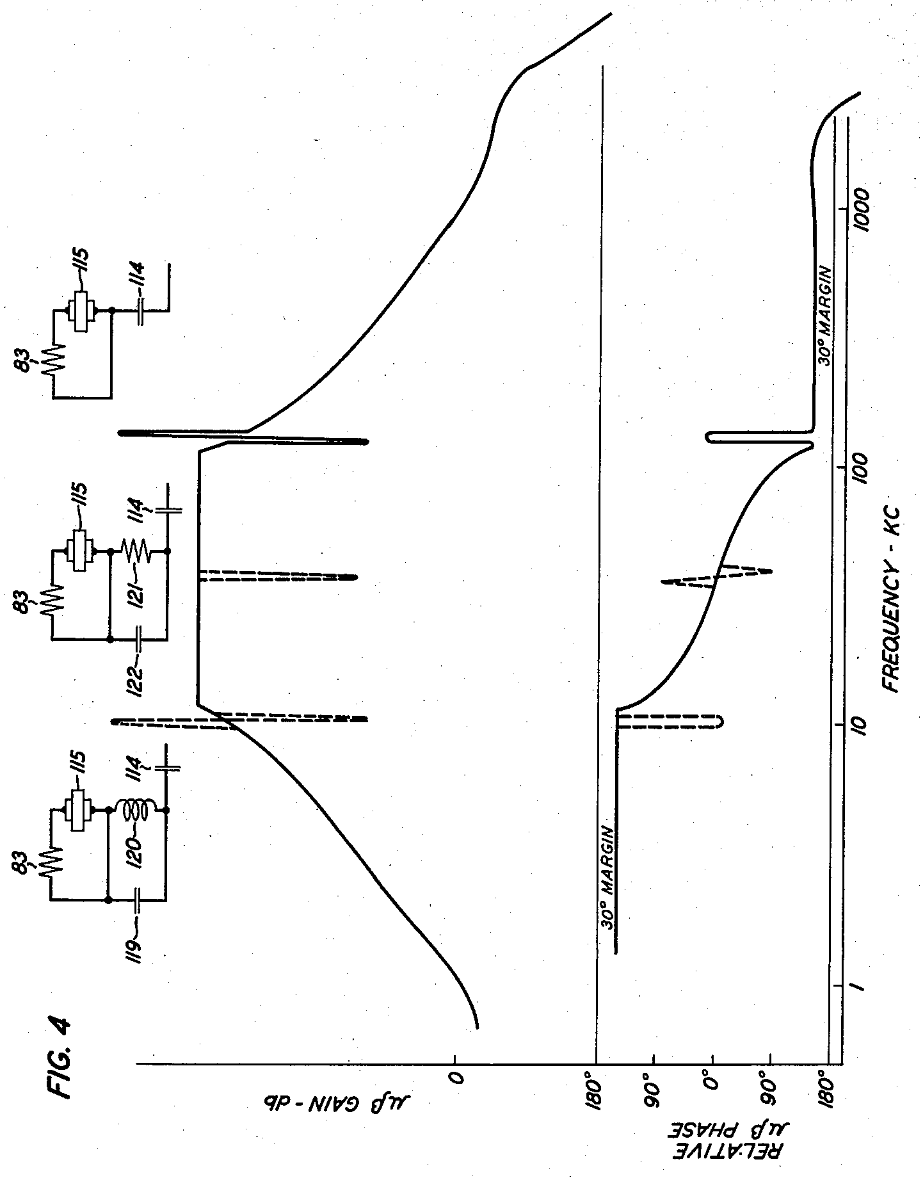
Fig. 4 shows the mu-beta gain and phase as a function of frequency for arrangements in which the resonant device is located within the mu-beta loop.

Now, it is a well-known property of electrical circuits of the minimum phase shift type that a closely spaced positive and negative deviation of circuit loss is accompanied by a deviation of phase, the sense of which is determined by the sense of the attenuation deviations. Moreover, a deviation of circuit loss which is all positive or all negative is accompanied by a phase irregularity which is both plus and minus. These facts are recognized and utilized in the design of the resonant elements included in this invention. Fig. 4 shows the plots of normal mu-beta gain frequency and phase frequency characteristics of a feedback amplifier of the type just described. Superimposed on these normal characteristics are shown three sets of irregularities. The irregularity at the upper edge of the band corresponds with the situation being described in the foregoing. It will be noted that the mu-beta gain or feedback is greatly reduced at a frequency just above the transmitted band. This results in a net gain peak for the repeater. At a slightly higher frequency the mu-beta gain or feedback is greatly increased which results in a net gain dip for the repeater. Now, in this frequency range, the mu-beta phase margin is low, usually about 30 degrees or the phase is displaced 150 degrees from midband phase. Obviously, if the phase irregularity accompanying the gain spike were in the direction of reducing the phase margin the repeater could become unstable which must be avoided. By choosing the type of irregularity shown, namely, a decrease and then an increase of feedback, the phase irregularity approaches 180 degrees back toward midband phase with no decrease in phase margin or impairment of stability of the amplifier. Moreover, at midband phase the change of external gain with tube performance is at a maximum, being proportional to $$\frac{\mu}{1-\mu B}$$

This effect passes through zero at 90 degrees either way from midband so these phase points must be avoided if the circuit is to be used to measure tube performance.

Figure 3:
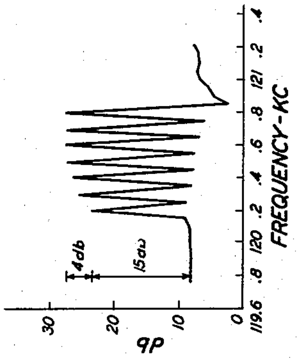
Fig. 3 shows the noise frequency characteristic of the system of Fig. 1 employing either of two embodiments.

The thermal noise currents generated in the cable resistance are amplified by the repeaters, and these noise currents are uniformly distributed over a wide frequency range. At the higher frequencies, the thermal noise currents are amplified by each repeater with very little additional noise current due to repeater input, circuit resistance and Shott effect. At the crystal resonance, where the gain increases over a narrow band, this noise energy per cycle of band width is also increased by the amount of the gain spike. In the output circuit of the repeater, therefore, there will be found a noise spectrum in which a relatively large amount of noise energy is located at the crystal frequency relative to that a few cycles higher or lower. The noise energy falls off rather slowly in either direction away from the peak. In a system comprising a number of repeaters and cable sections in tandem, the total noise energy at the receiving end is composed of the sum of the noise spectra in each repeater output. Since each repeater spike is at a slightly different frequency there must be a tunable, narrow band, noise measuring device at the receiving terminal in order to pick out and measure the noise spike which identifies each particular repeater. For optimum resolution, the band width of the detector should preferably be a little narrower than the band of the gain spike. As shown in Fig. 1, a detector 59, which may conveniently be a heterodyne frequency analyzer of the type shown in United States Patent 1,976,481, October 9, 1934, T. G. Castner, is connected to the receiving end of the cable. This detector 59 preferably has a pass band only a cycle or so wide, and is successively tuned to measure the successive spikes of noise current from the cable. As shown in Fig. 3, these noise spikes may have amplitudes of some 15 to 20 decibels although due to the successive addition of noise energy in the successive repeater outputs the spikes will not be of uniform height. In general, the larger the number of repeaters the greater should be the spike magnitude in the individual repeater to preserve a good margin for identification at the receiving end of the system.

Now, it is clear that if a failure occurs in some repeater which does not affect the direct current circuit of the cable, the detector 59 may be used to check the presence of the noise spike of each working repeater back from the receiving end until the absence of the noise spike of the failed repeater, and the absence of all noise spikes from preceding repeaters, is noted.

It is also clear that if some external disturbing noise enters the system of such character that it has components falling into one or more of the noise spikes, the detector 59 may also be used to indicate which spikes are contributing the major portion of the excessive noise and thus a location can be made from the receiving end of the system.

A further feature of this system is that a test oscillator may be connected into the circuit at the transmitting end. A test frequency, either at a crystal peak, or at various frequencies off a crystal peak, can be measured by the receiving detector to show the height of the gain peak due to each crystal. For a transmission measurement of this sort the test frequency energy must be large compared with the noise energy so that the measurement is not affected by noise but it also should be well below the maximum repeater load carrying capacity. Now, it will be recalled that the feedback is greatly reduced at the gain peak and that the phase is approximately that at midband of the repeater. Changes in gain under these conditions are proportional to $$\frac{\mu}{1-\mu B}$$

When $\mu B$ is small, as at the crystal peak, the gain is approximately proportional to $\mu$, which is the effective amplification of the three vacuum tubes. As the performance of the vacuum tubes falls off, the gain at the gain peak will also fall off, but, at frequencies away from the peak and within the repeater band, where $\mu B$ is large, the gain is very much less dependent upon the change in tube performance $\mu$. Thus, transmission measurements made at the crystal peak relative to transmission measurements at any other frequency within the band will be a very sensitive indicator of tube performance and the magnitude of the gain spike associated with each repeater will be indicative of the tube performance in that repeater. It is possible to determine, therefore, the group performance of all three tubes in each repeater separately.

If a series of gain-load transmission measurements show the gain of a repeater to be abnormally low, under some conditions, these measurements will indicate whether the output tube, or one of the other tubes, has deteriorated. Weak output tubes may be located by making the gain load measurements first at the crystal frequency of the repeater nearest the receiving end, to determine the condition of this repeater alone.

Then, by using the crystal frequency of the next to the last repeater, the load performance of the two combined can be measured, etc. This method locates the weakened repeater from the load standpoint but one weak repeater may mask lesser weaknesses in preceding repeaters. Overload may also be measured at frequencies away from the crystal frequencies in conventional manner. Gain deterioration in either of the first two tubes will have little effect upon overload characteristics, unless the gain deterioration is very large. Deterioration of the output tube directly affects overload regardless of feedback. Thus, from inspection of data on the loss of feedback and break point it is possible to determine if the output tube or one of the other stages is at fault.

Modulation tests may also be performed, if desired, using crystal spike frequencies to help in the location of trouble in repeaters. Such tests may be made in a variety of ways involving second or third harmonic measurements or multifrequency second or third order product measurements in which the spike is used either to select the harmonic or product, or to raise a fundamental to higher level at a particular repeater and succeeding repeaters.

Under some circumstances it may be preferred to locate the testing frequencies in the region of the center of the transmission range of the repeaters. Referring to Fig. 4, a mu-beta gain dip is shown at this location which, of course, would result in an overall repeater gain peak at this frequency. In this location it is desirable to allow the accompanying phase irregularity to go plus and minus, passing through midband phase at the peak frequency. This is done by choosing a resonant network such that the accompanying mu-beta gain spike is eliminated. One way of doing this is shown in the associated network configuration in Fig. 4. The network may be regarded as being composed of a crystal 115 and series resistance 121 shunted with a high frequency by-passing condenser 122 or it may actually be composed of equivalent electrical elements, or of an electromechanical device.

In this arrangement an advantage may be found over the arrangement with the spike at the top or bottom of the repeater band, in that the transmission distortion of the peak frequency is much less, because the peak determining potentiometer at resonance is formed by the crystal resistance and the series resistance, whereas, off resonance, the crystal impedance is reactive and the potential divider ratio increases much more rapidly as a function of frequency than the case in which the potential divider includes both resistance and reactance at resonance, becoming all reactive off resonance. This will permit locating the gain spikes at much closer intervals and will thus narrow the system band which must be set aside for this testing function.

Referring again to Fig. 4, it should be noted that the spikes could be located at the lower edge of the repeater band by reversing the mu-beta gain dip and peak to create a phase deviation in the opposite sense from that at the top edge. This calls for a different network including the inductor 120 and capacitor 119 to create the transmission irregularity as shown.

Figure 5:
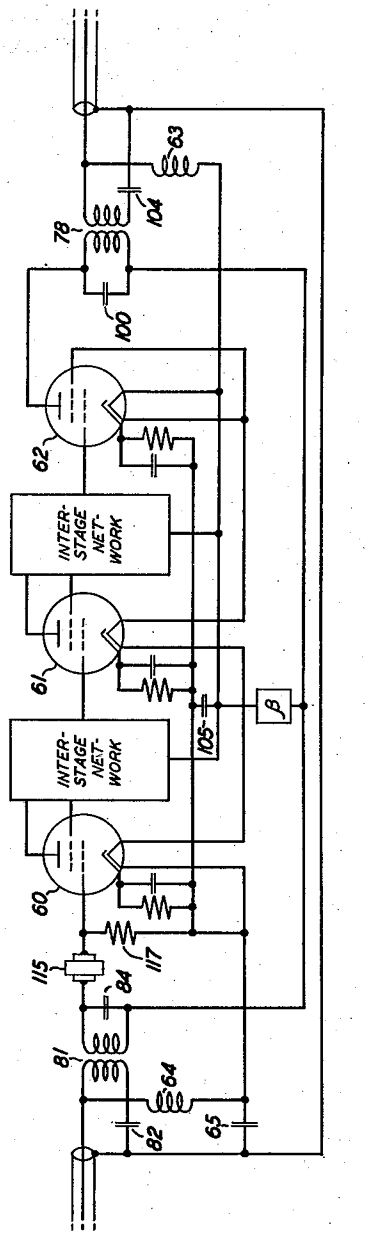
Fig. 5 shows a less detailed repeater schematic in which the resonant device is located in the mu circuit instead of in the beta circuit.

Fig. 5 shows an arrangement in which the resonant circuit is placed in the mu circuit instead of the beta circuit. For example, the crystal 115 is placed in series with the grid of the input tube 60, the crystal electrodes forming the grid coupling condenser. At resonance, the crystal will have little effect on the repeater characteristic, but at crystal antiresonance its effective resistance becomes very high. The result is that the grid leak resistor 117 is the main factor controlling grid and cathode resistance, and since its value is normally many times the input transformer impedance the resistance noise in the grid circuit is increased at this antiresonant frequency, thus providing the desired fault locating thermal noise spike. The gain of the amplifier mu circuit will also be decreased at antiresonance so that transmission measurement at antiresonant frequency will indicate tube condition. The net amplifier gain, however, will show little change at this frequency because the change is introduced into the mu circuit rather than the beta circuit. The external gain is proportional to $$\frac{\mu}{1-\mu B}$$

and, when $\mu B$ is large, this expression is relatively insensitive to change in $\mu$. This arrangement possesses an important advantage over that in which the resonant circuit is located in the beta circuit in, that the small external gain peaks make it much more practical to employ in 22-type repeaters where a singing problem is encountered if the repeater gain is excessive at any frequency in or near the transmitted bend of the repeater. The same advantage applies in a somewhat similar situation involving equivalent four-wire repeaters using filters to separate opposite directions of transmission and in multiconductor cables such as spiral-four quads where excessive gains might cause excessive circulating currents, or even repeater instability. Since the gain irregularity in the mu-beta loop is all in one sense instead of being plus and minus, it is necessary to confine the use of this arrangement to the center of the transmitted band of the repeater where the mu-beta loop phase can be permitted to gyrate plus and minus 90 degrees without affecting stability. An alternative arrangement which might be preferred is to connect the crystal in series with the grid as shown in Fig. 5 but instead of using a shunt grid leak, a high resistance may be shunted across the crystal. This may call for a blocking condenser and leak to be associated with the beta circuit to remove the direct current plate voltage from the grid circuit.

Figure 6:
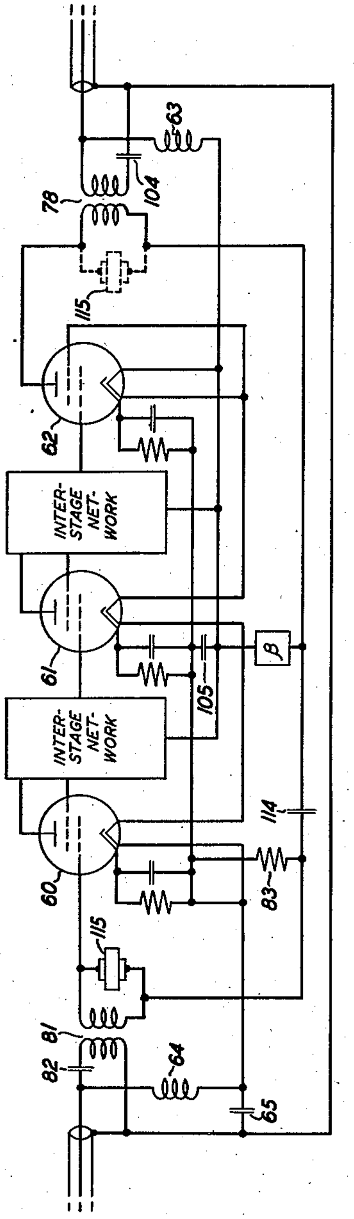
Fig. 6 shows a similar repeater schematic in which the resonant device is located in the input or output circuit.

In Fig. 6 the resonant device 115, for example a crystal, is placed across the input, or the output, transformer. In this case there is no gain peak but at crystal resonance there is a gain dip where the thermal noise is very much lower than in other parts of the band. Although this will yield little or no special information concerning the tube performance by transmission measurement, it will locate, by the reduction of thermal noise in particular narrow frequency bands, repeaters which have failed, even if the direct current power circuit is unbroken. This arrangement is applicable to a system of repeaters which may or may not employ feedback.

What is claimed is:

1. A long distance communication system comprising sending and receiving terminal stations adapted to transmit communications in a wide band of frequencies, a transmission channel connecting said stations and including a plurality of repeaters spaced at intervals therealong, each repeater including a device continuously producing a pronounced irregularity in the gain-frequency characteristic of the repeater over a different narrow band of frequencies each band being uniquely characteristic of a repeater, and a meter at said receiving terminal adapted to be connected to said channel to measure the currents transmitted by said channel in each of said narrow bands of frequencies.

2. A long distance communication system comprising terminal stations adapted to transmit communications in a number of hands of frequencies, a transmission circuit connecting said stations including a plurality of repeaters spaced at intervals therealong and each having a negative feedback circuit, devices connected across the feedback circuits to produce pronounced irregularities in the gain frequency characteristics of the repeaters over narrow bands of frequencies, each band being uniquely characteristic of a repeater, and a meter at one terminal connected to said circuit to measure the currents transmitted by said circuit in each of said narrow bands of frequencies.

3. A long distance communication system comprising sending and receiving terminals adapted to transmit communications in a number of bands of frequencies, a pair of one-way cables respectively connecting said sending and receiving terminals to form a two-way system and including a plurality of one-way repeaters spaced therealong, each repeater including a device continuously producing a pronounced irregularity in the gain frequency characteristic of the repeater over a narrow band of frequencies uniquely characteristic of the repeater, a filter connecting the far ends of said cables and passing currents in all said narrow bands of frequencies and a meter connected to the cable at the near end receiving terminal to measure the currents transmitted by said cables in each of said narrow bands of frequencies.

4. A long distance communication system comprising sending and receiving terminals adapted to transmit communications in a number of bands of frequencies, a metallic circuit connecting said stations including a plurality of repeaters spaced at intervals therealong said repeaters each including equalizing networks and negative feedback circuits generating noise currents much smaller than the thermal noise currents of said metallic circuit, resonant devices connected across the feedback circuits to produce pronounced irregularities in the gain frequency characteristics of the repeaters over narrow bands of frequencies each band being uniquely characteristic of a particular repeater, and a meter at one terminal connected to said circuit and adjustable to measure the noise currents transmitted by said circuit in each of said narrow bands of frequencies.

5. A long distance communication system comprising sending and receiving terminal stations adapted to transmit communications in a wide band of frequencies, a transmission channel connecting said stations and including a plurality of repeaters spaced at intervals therealong, each repeater including a crystal resonant over a narrow band of frequencies uniquely characteristic of the repeater to continuously produce a pronounced irregularity in the gain-frequency characteristic of the repeater, and a meter at said receiving terminal adapted to be connected to said channel to measure the currents transmitted by said channel in each of said narrow bands of frequencies.

6. The combination in claim 5 in which the crystal is connected in the input circuit of the repeater.

7. The combination in claim 5 in which the crystal is connected in the output circuit of the repeater.

8. The combination in claim 5 in which reverse feedback circuits are respectively connected from the output circuits to the input circuits of the repeaters and the crystals are respectively connected across the feedback circuits.

9. A transmission channel including a plurality of repeaters spaced at intervals therealong, each repeater including a plurality of amplifying stages connected in cascade, crystals sharply resonant at different frequencies uniquely characteristic of the individual repeaters respectively connected in serial relationship with an impedance element across the output circuits of the repeaters, the crystals alone being also respectively connected in the input circuits of the repeaters.

10. The combination in claim 9 in which the crystals resonate near the upper end of the pass band of the repeaters and the impedance is a negative reactance.

11. The combination in claim 9 in which the crystals resonate in the pass band of the repeaters and the impedance is a resistance.

12. The combination in claim 9 in which the crystals resonate near the lower end of the pass band of the repeaters and the impedance is a positive reactance.

LESTER M. ILGENFRITZ.
RAYMOND W. KETCHLEDGE.

REFERENCES CITED

The following references are of record in the file of this patent:

UNITED STATES PATENTS

| Number | Name | Date |
|---|---|---|
| 2,223,200 | Augstadt | Nov. 26, 1940 |
| 2,231,542 | Mallinkrodt | Feb. 11, 1941 |
| 2,267,286 | Meyers | Dec. 23, 1941 |
| 2,315,434 | Leibe | Mar. 30, 1943 |
| 2,315,435 | Leibe | Mar. 30, 1943 |
| 2,372,759 | Black | Apr. 3, 1945 |
| 2,509,365 | Parmentier | May 30, 1950 |